(12) United States Patent
Meltzer

(10) Patent No.: US 6,545,741 B2
(45) Date of Patent: Apr. 8, 2003

(54) STEREOSCOPIC IMAGING USING A SINGLE IMAGE SENSOR

(75) Inventor: Robert B. Meltzer, Phoenix, AZ (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/951,935

(22) Filed: Sep. 10, 2001

(65) Prior Publication Data

US 2003/0048416 A1 Mar. 13, 2003

(51) Int. Cl.[7] ........................... G03B 35/02; G03B 35/16
(52) U.S. Cl. ........................................................ 352/62
(58) Field of Search ........................ 352/62, 60; 348/49

(56) References Cited

U.S. PATENT DOCUMENTS

| | | | |
|---|---|---|---|
| 4,799,199 A | * 1/1989 | Scales et al. | 365/230.08 |
| 5,028,994 A | * 7/1991 | Miyakawa et al. | 348/49 |
| 5,634,159 A | * 5/1997 | Caregnato | 396/327 |
| 5,835,133 A | 11/1998 | Moreton et al. | 348/49 |
| 6,038,071 A | * 3/2000 | Chikazawa | 359/464 |
| 6,363,225 B1 | * 3/2002 | Sugawara | 396/331 |

* cited by examiner

Primary Examiner—Russell Adams
Assistant Examiner—D. Ben Esplin
(74) Attorney, Agent, or Firm—Trop, Pruner & Hu, P.C.

(57) ABSTRACT

A stereoscopic viewing system permits separate imaging of left and right images of a particular object. Each image may be sequentially captured on the exact same imaging sensor and then transferred either to storage or for separate stereoscopic display. As a result, a single image sensor may be utilized to reduce costs of the system without significantly decreasing the time for display.

17 Claims, 3 Drawing Sheets

STEREOSCOPIC IMAGING USING A SINGLE IMAGE SENSOR

BACKGROUND

This invention relates generally to stereoscopic or three-dimensional imaging wherein left and right image pairs are captured on an image sensor.

A conventional stereoscopic image capture device utilizes a pair of separate imaging systems. Each imaging system captures an image of an object from a different perspective. The resulting captured images, called left and right image pairs, may be viewed in tandem to create the effect of three-dimensional viewing. Alternatively, the image pairs can be computer-combined to create a three-dimensional representation of the imaged scene.

Necessarily, two complete optical systems with accompanying image sensors are utilized to provide such systems. This results in at least doubling the cost of the system for three-dimensional applications.

Therefore, there is a need for a way to enable stereoscopic imaging without significantly increasing the cost of the system.

DETAILED DESCRIPTION

Figure 1:
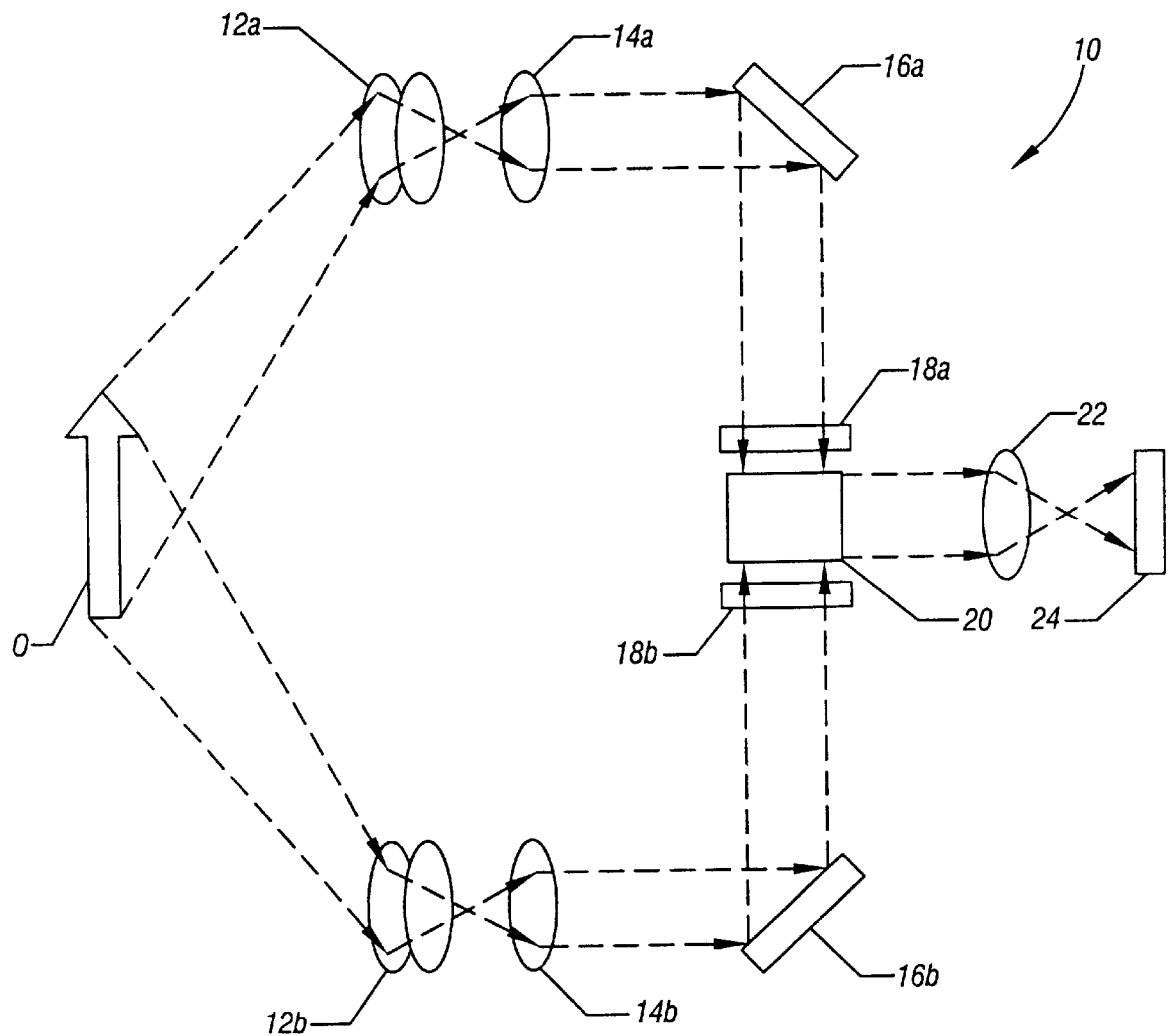
FIG. 1 is a schematic depiction of one embodiment of the present invention.

Referring to FIG. 1, an imaged object O may be separately imaged by a stereoscopic imaging system 10. A left and right image pair is successively captured on the image sensor 24. A first front element optics 12a receives light from the object O and passes it through transfer optics 14a. The resulting image is reflected by a 45 degree mirror 16a where it passes through or is blocked by a shutter 18a.

From the shutter 18a the image is passed and is reflected by the integrating optics 20. The optics 20 may be an optical beam combiner in one embodiment. The resulting image is then passed through the focusing optics 22 to the sensor 24. The sensor 24 is conventionally a charge-coupled device or complementary metal oxide semi-conductor sensor 24 that captures a digital representation of the image.

Figure 3:
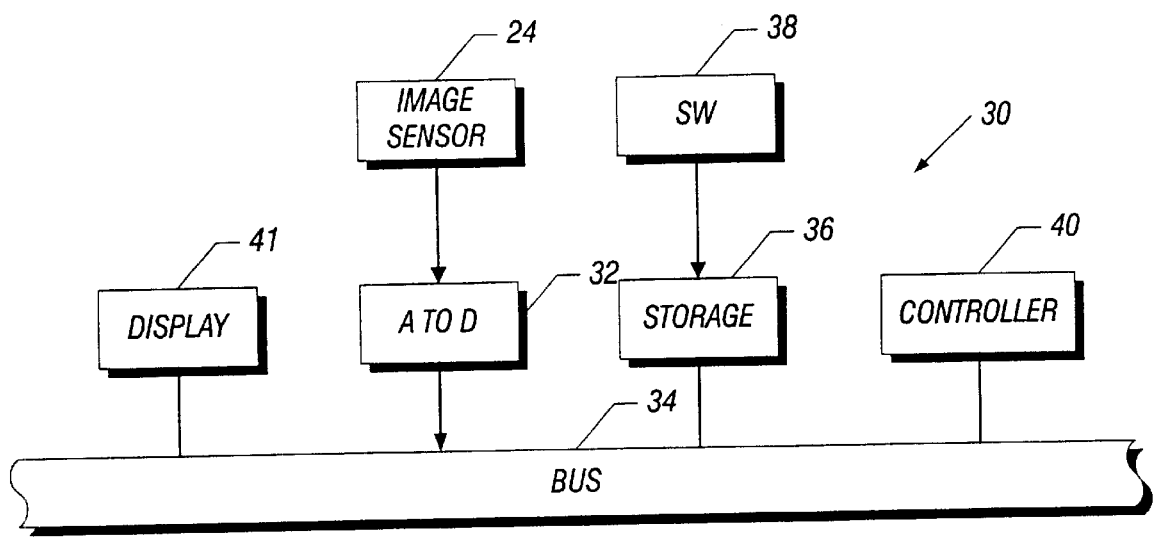
FIG. 3 is a block diagram in accordance with one embodiment of the present invention.

The sensor 24 captures a right image from the optics 12a through 18a and transfers the captured image to a storage 36 shown in FIG. 3. A left image is captured by the optics that includes the second front element optics 12b, transfer optics 14b, mirrors 16b, and shutter 18b. When the right image is to be captured, the shutter 18a is open and the shutter 18b is closed. Conversely, when the left image is being taken, the shutter 18b is open and the shutter 18a is closed.

As a result, left and right images may be successively captured by the sensor 24 and transferred to an associated storage 36. From the storage 36, the captured images may be presented for left and right viewing or may be combined using appropriate image processing techniques to generate a three-dimensional representation of the captured object O.

Because each optical path is identical, the resulting left and right images are of substantially identical quality. Therefore, the left and right images may be effectively combined in some embodiments.

In one embodiment, the left and right images may be taken in rapid succession using a "burst mode" on the system 10 to avoid temporal blur or artifacts. The two captured left and right image fields may then be processed by the imaging device 10 or a host computer (not shown) to form a three-dimensional perspective of the object being imaged.

In some embodiments, the system 10 may be a digital camera, a video camera, a digital imaging system, or an imaging device for use in connection with computer games, binoculars or a microscope, to mention a few examples.

In some embodiments, the form factor may be relatively small and less expensive. The use of a single sensor may result in reduced complexity and cost. The system permits an adjustable parallax in a single system. The spacing between systems including lenses 12a and 12b may be adjusted. In fact, the transfer optics spacing may even be asymmetrical.

The two optical paths may share the same back end focusing optics. The length to the optical transfer path may be varied allowing for non-matching path lengths depending on system design. This also allows for an expandable distance between the taking lens and allows the construction on variable stereo separation of images.

In some embodiments, a'single set of optics may be used by removing the frontal element optics 12a and 12b and transferring the image via mirrors allowing for scenarios similar to that of a simple periscope.

In some embodiments, the shutters 18 may be mechanical shutters. In other embodiments, electronic shutters such as liquid crystal shutters may be utilized.

Figure 2:
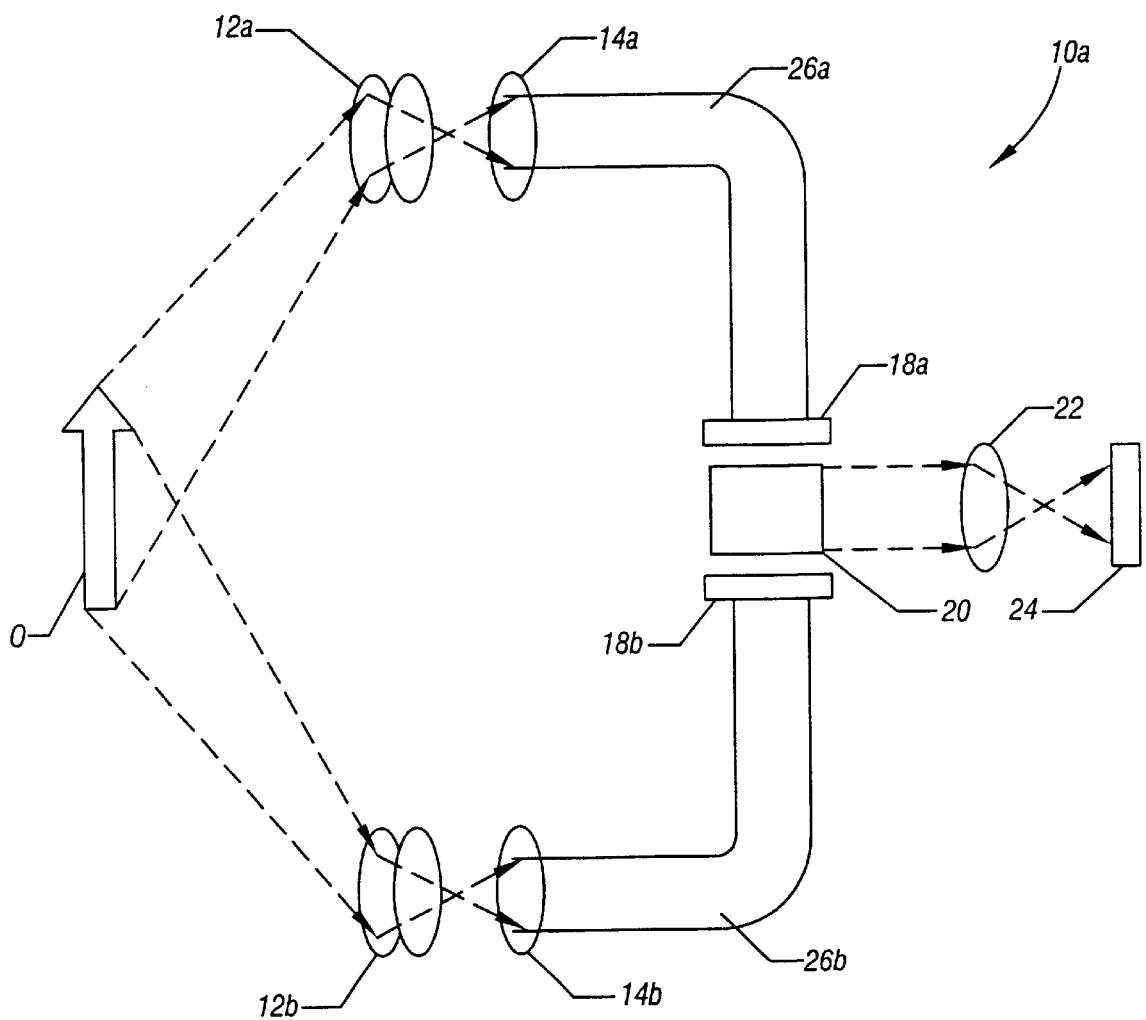
FIG. 2 is a schematic depiction of another embodiment of the present invention.

Referring to FIG. 2, the transfer optics may be replaced with fiber optic cables 26. The flexible fiber optic cable 26 is used so that the location of the optical paths becomes even more adaptable. Thus, the spacing between the optics 12a and 12b may be readily adjusted using a flexible optical cable 26.

Referring to FIG. 3, an electrical system 30 for use with the imaging system 10 may include a bus 34. The bus 34 is coupled to an analog to digital converter 32 that converts the analog output from the image sensor 24 into a digital format. The captured images may be transferred over the bus 34, under control of the controller 40, to the storage 36. Software 38 also stored on the storage 36 may control the capture and transfer of images. A display 41 may also be coupled to the bus 34.

In accordance with one embodiment of the present invention, software 38 may be utilized to enable control over operations of the systems 10 and 30. In other embodiments, the control may be done by hard-wired logic.

Figure 4:
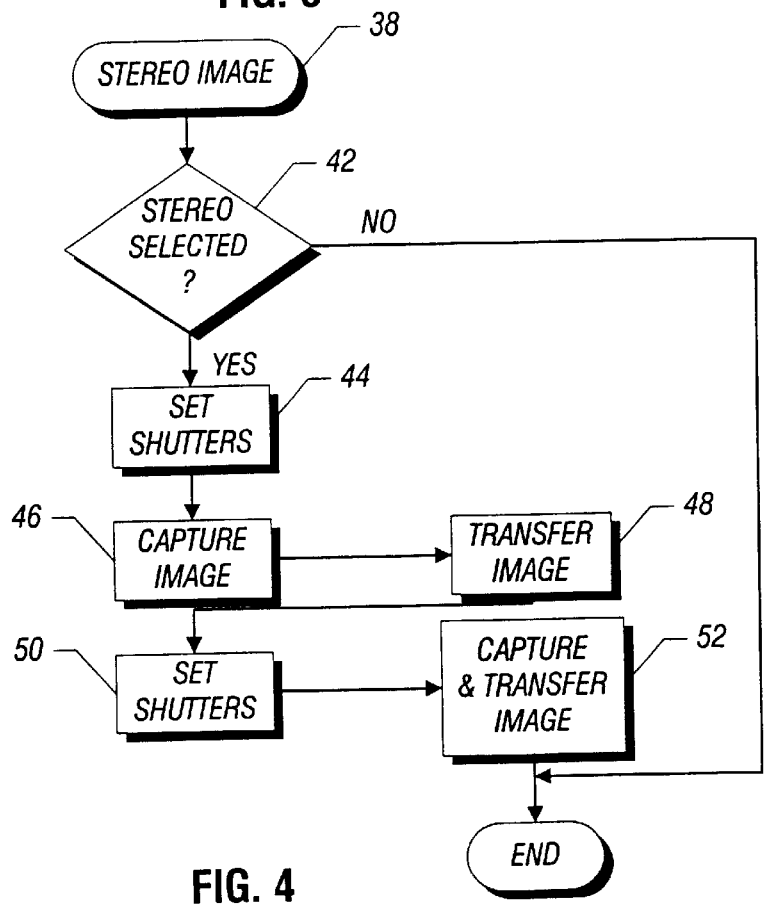
FIG. 4 is a flow chart for software in accordance with one embodiment of the present invention.

Referring to FIG. 4, the software 38 begins by determining whether stereo imaging has been selected as determined at diamond 42. If so, the shutters 18a and 18b may be set appropriately to capture either the left or right image as indicated in block 44. An image is then captured as indicated in block 46. That captured image may be burst transferred to the storage 36 over the bus 34 as indicated in block 48. The shutters 18 are reset during the image transfer process in one embodiment of the present invention as indicated at block 50. The next image is captured and transferred as indicated in block 52 to create a left and right stereo pair.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A method comprising:

developing a left image of an object;

developing a right image of an object;

successively passing the left and right images of the object to an imaging sensor;

successively transferring said captured image from said image sensor; and successively transferring includes burst transferring left and right images successively to a storage.

2. The method of claim 1 wherein developing a left and right images of an object includes using a pair of parallel spaced optical sections.

3. The method of claim 2 including reflecting light from each optical section to a shutter.

4. The method of claim 3 wherein successively passing the left and right images of the object includes providing a pair of shutters, each shutter controlling the passage of light from one of said sections, such that one of said shutters is open to pass light when the other of said shutters is closed.

5. The method of claim 4 including passing light from said sections to said shutters using fiber optic cables.

6. The method of claim 4 including using mirrors to reflect light from said sections to said shutters.

7. The method of claim 2 including adjusting the distance between said sections.

8. An article comprising a medium storing instructions that enable a processor-based system to:

develop a left image of an object;

develop a right image of an object;

successively pass the left and right images of the object from an imaging sensor to a storage; and enable the processor-based system to burst transfer a first image to a storage while the second image is being captured.

9. The article of claim 8 further storing instructions that enable the processor-based system to control the operation of a pair of shutters to successively pass left and right images.

10. A system comprising:

a first imaging section;

a second imaging section spaced from said first imaging section;

an imaging device; and a shutter system to selectively control whether said first imaging section or said second imaging section provides an image to said imaging device, wherein said controller causes a burst transfer of said image from said imaging device to said storage.

11. The system of claim 1 wherein said first and second imaging sections include optical elements, each section having an optical path parallel to the other section.

12. The system of claim 10 wherein said first and second imaging sections include a fiber optic cable.

13. The system of claim 10 wherein said shutter system includes a pair of shutters, one shutter being associated with each imaging section.

14. The system of claim 13 wherein said shutters are mechanical shutters.

15. The system of claim 13 wherein said shutters are liquid crystal shutters.

16. The system of claim 10 including a prism to present the image from either said first or second imaging section to said imaging device.

17. The system of claim 10 including a controller to successively transfer an image from said first imaging section to a storage and then to transfer an image from said second imaging section to said storage.

* * * * *